March 17, 1970  P. HAMILL  3,500,601
BUILDING STRUCTURES
Filed Nov. 8, 1967  9 Sheets-Sheet 1

Peter Hamill INVENTOR
by Wolf, Greenfield & Hieken

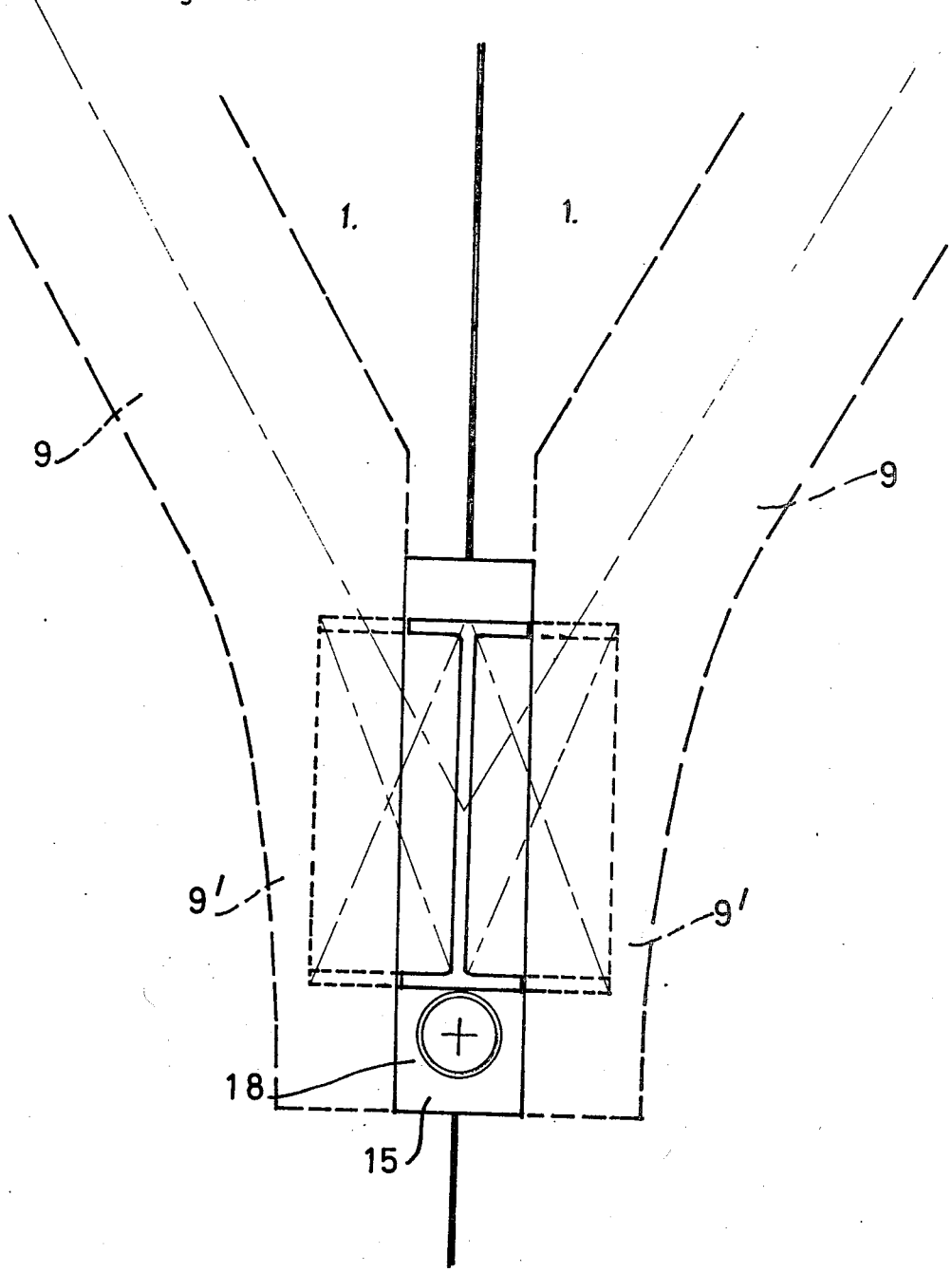

March 17, 1970 P. HAMILL 3,500,601
BUILDING STRUCTURES
Filed Nov. 8, 1967 9 Sheets-Sheet 7

March 17, 1970  P. HAMILL  3,500,601
BUILDING STRUCTURES

Filed Nov. 8, 1967  9 Sheets-Sheet 8

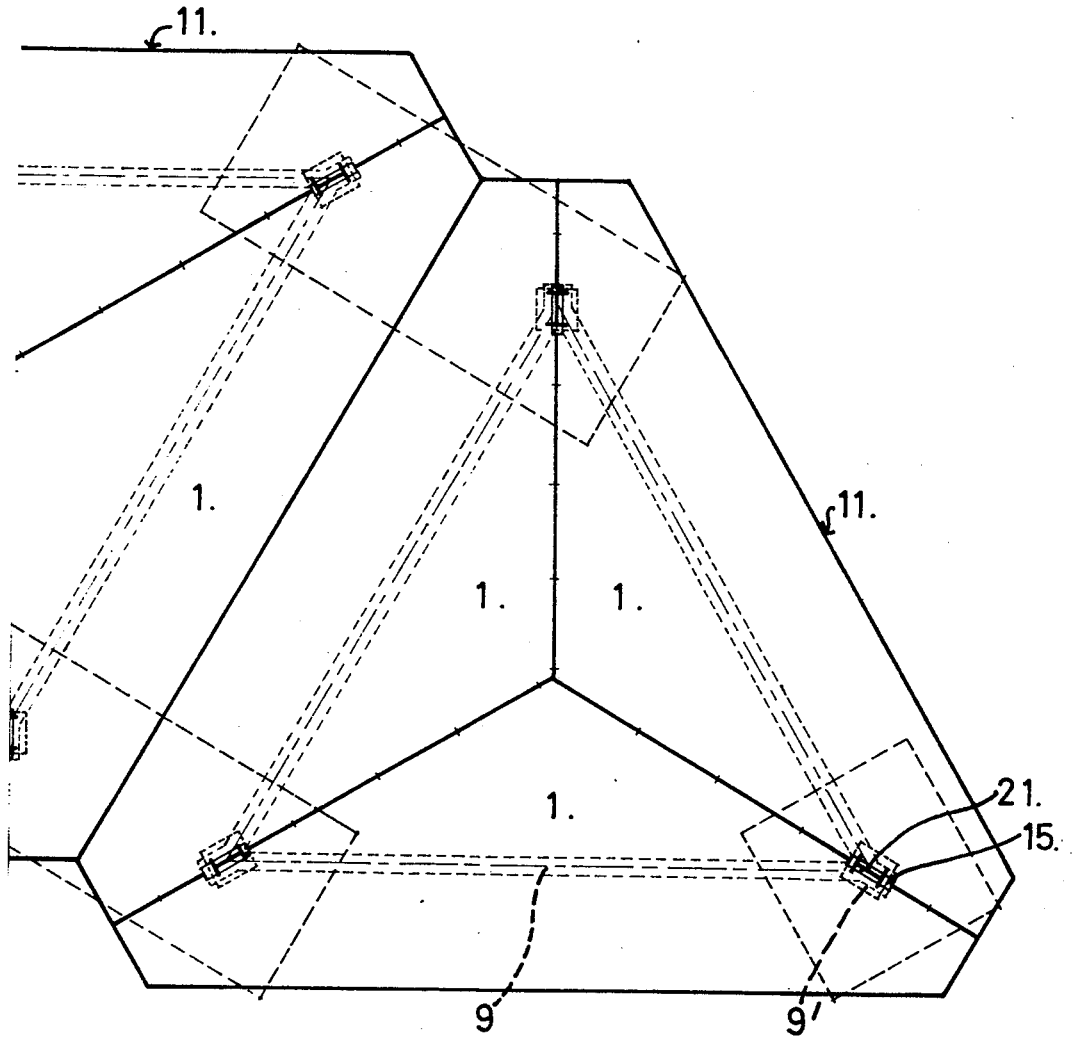

United States Patent Office 3,500,601
Patented Mar. 17, 1970

3,500,601
BUILDING STRUCTURES
Peter Hamill, Bella Vista, Leeds Lane,
Five Ashes, Sussex, England
Filed Nov. 8, 1967, Ser. No. 681,492
Claims priority, application Great Britain, Nov. 14, 1966, 50,921/66
Int. Cl. E04c 1/28; E04g 21/14
U.S. Cl. 52—236   10 Claims

ABSTRACT OF THE DISCLOSURE

This invention relates to a building element for use in erecting a building structure, such as a dwelling for human habitation, in which a plurality of said building elements are joined together to form the floor and ceiling (or roof) of said structure, and together with structural supporting columns provide the main building structure.

BACKGROUND OF THE INVENTION

To form the floor and ceiling of a building structure, use has hitherto been made of building elements in the shape of flat, rectangular bodies which have been prefabricated by moulding and which are joined together in situ to form said floor and ceiling.

This conventional shape of the building element limits the scope of design of the structure and frequently makes it impossible to adapt the structure to the landscape or other environment, with the result that aesthetic considerations must be foregone. Furthermore, the handling on the building site of the conventional building element requires a large labour force and the use of powerful mechanical lifting appliances, scaffolding, and timber formwork.

The present invention aims at reducing the labour force required to handle the building elements for erection of building structures and at providing a greater flexibility of design of such structures than has hitherto been possible with conventional building elements, particularly with regard to subsequent vertical extension causing minimum inconvenience to the occupants of the building, and the provision of a wide variety of plan shapes for the building.

SUMMARY OF THE INVENTION

To this end, the present invention consists in a building element, comprising a flat body having the shape of an isosceles triangle of which the two equal sides are shorter than the third side or base, and having on one of its two largest surfaces an integral beam extending parallel and in spaced relationship to said third side or base of the triangle.

Advantageously, three such building elements form a building unit by being joined together in one plane along their equal sides so as to form a larger equilateral triangle.

At least two building units may form a building structure, said units respectively constituting the floor and ceiling (or roof) of the structure and being arranged vertically aligned and spaced apart by means of supporting columns engaging in apertures formed by oblong recesses in the adjacent equal sides of two adjacent triangular bodies.

Figure 5:
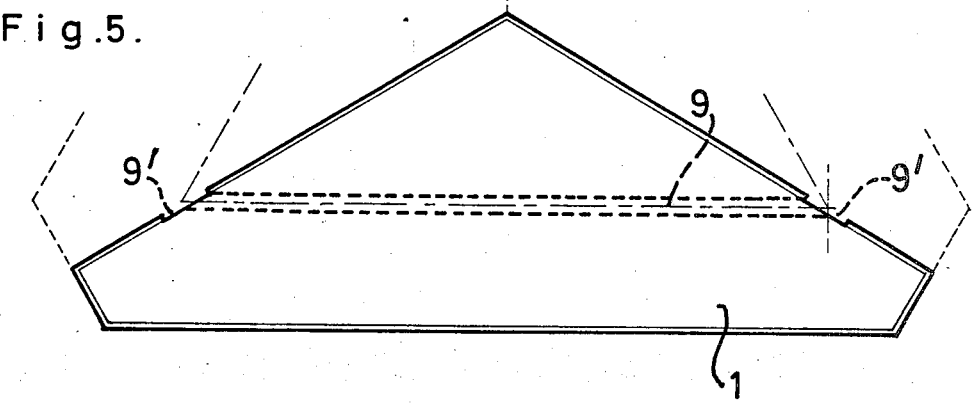
Figure 6:
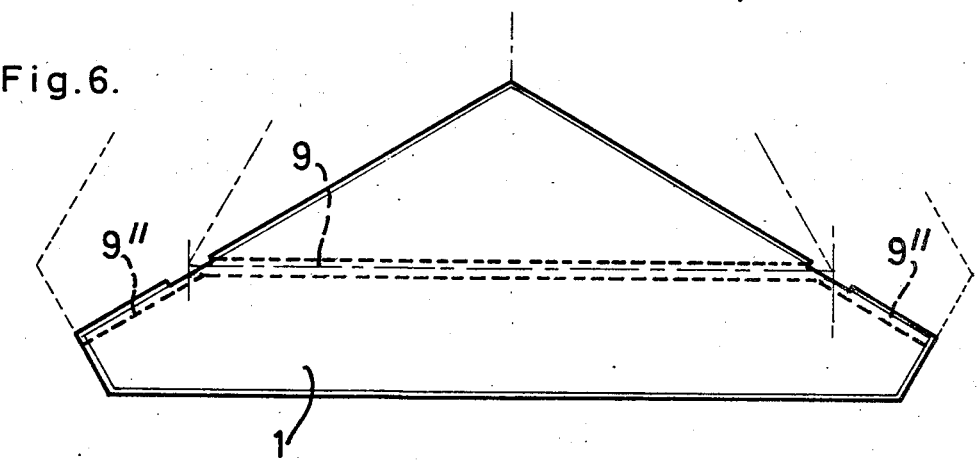
Figure 7A:
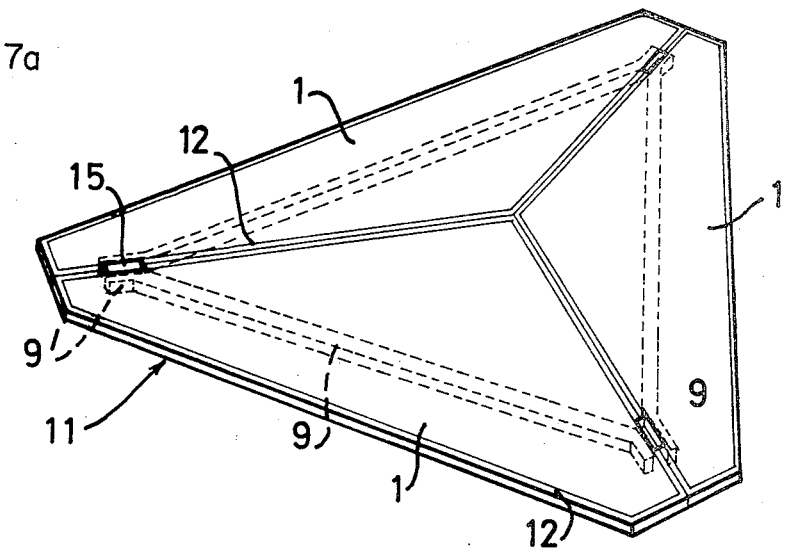
Figure 7B:
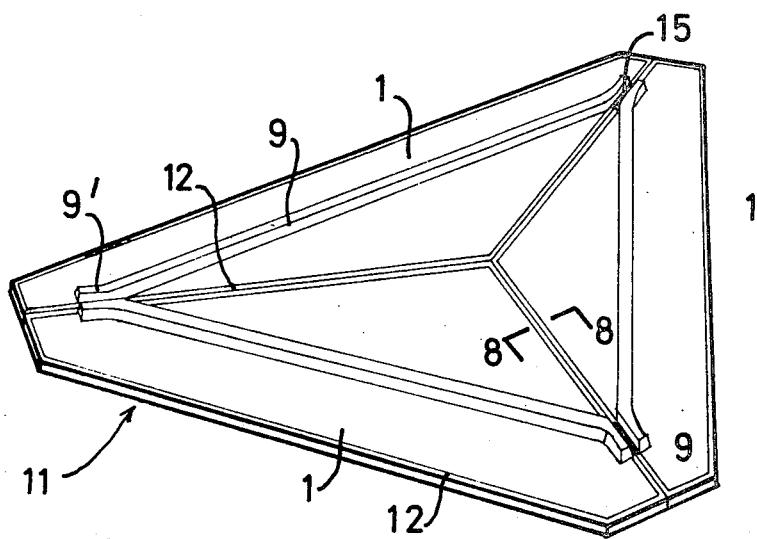
Figure 8:
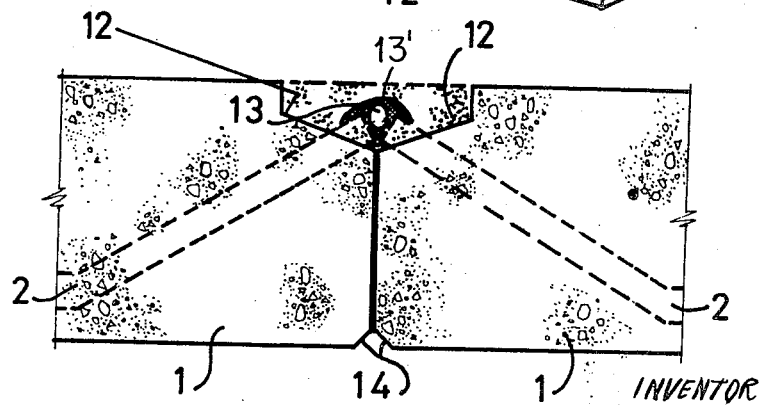
Figure 9B:
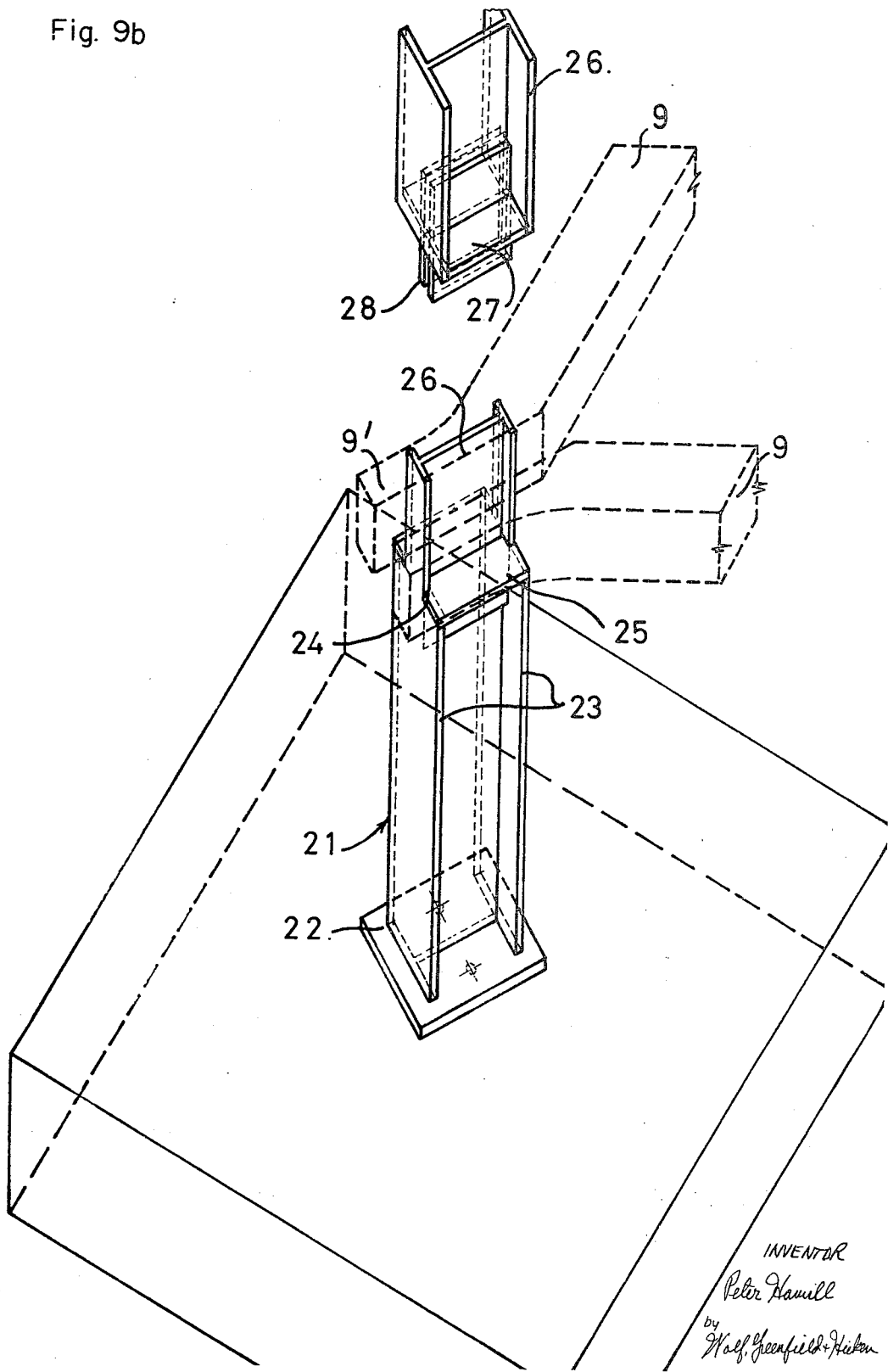
Figure 10A:
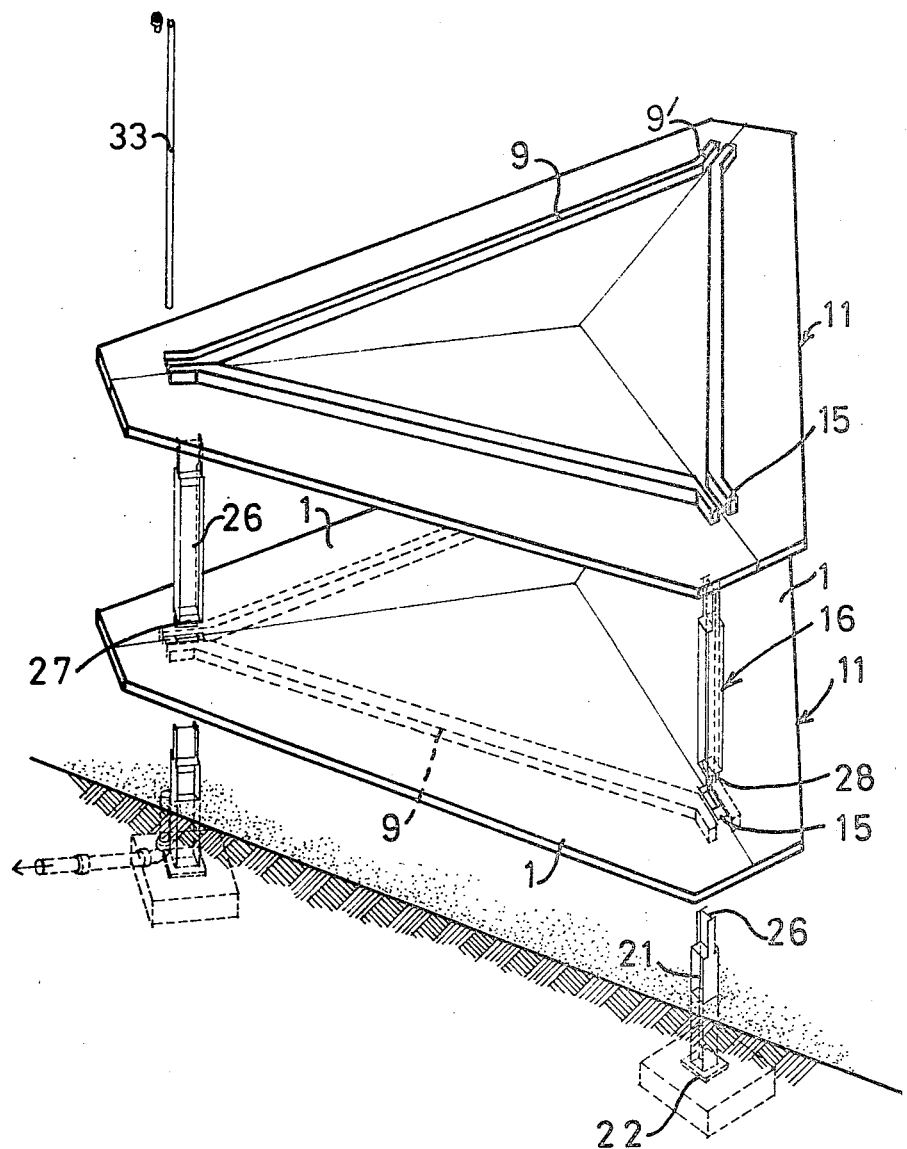
Figure 10B:
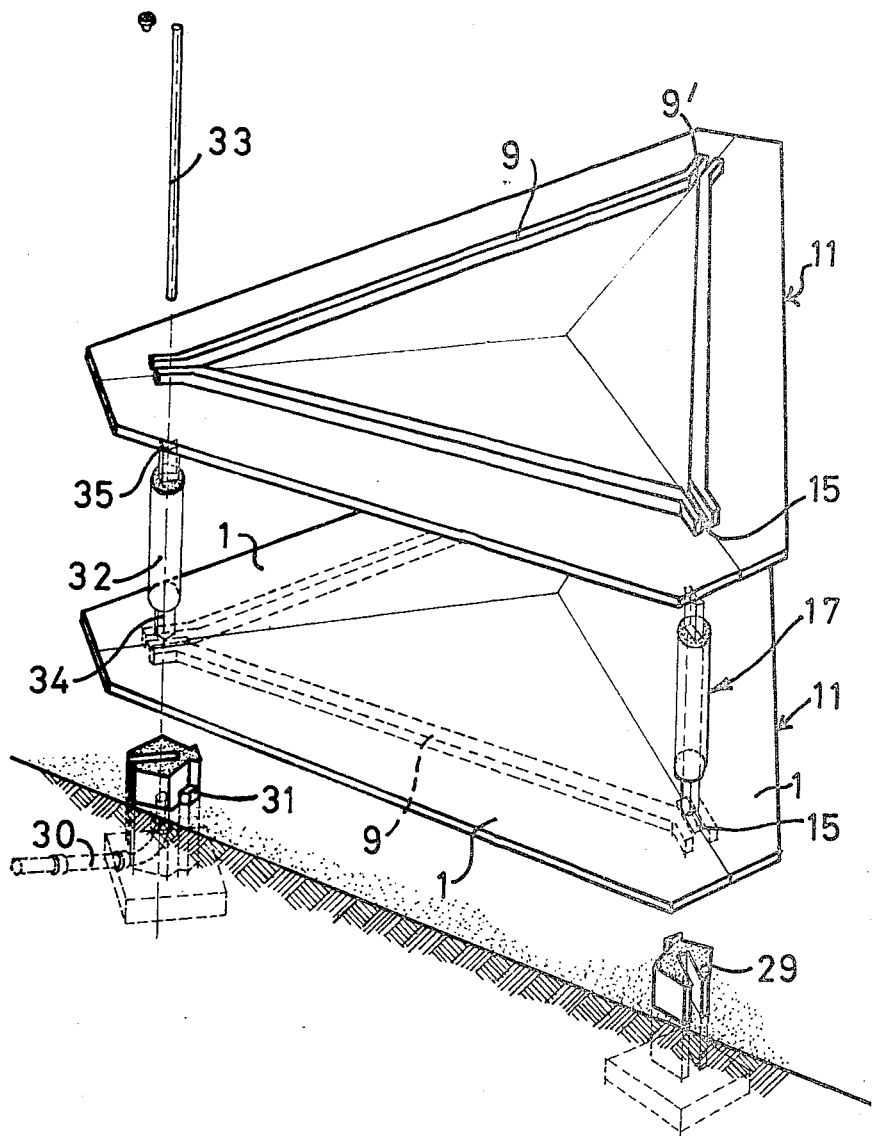
Figure 11:
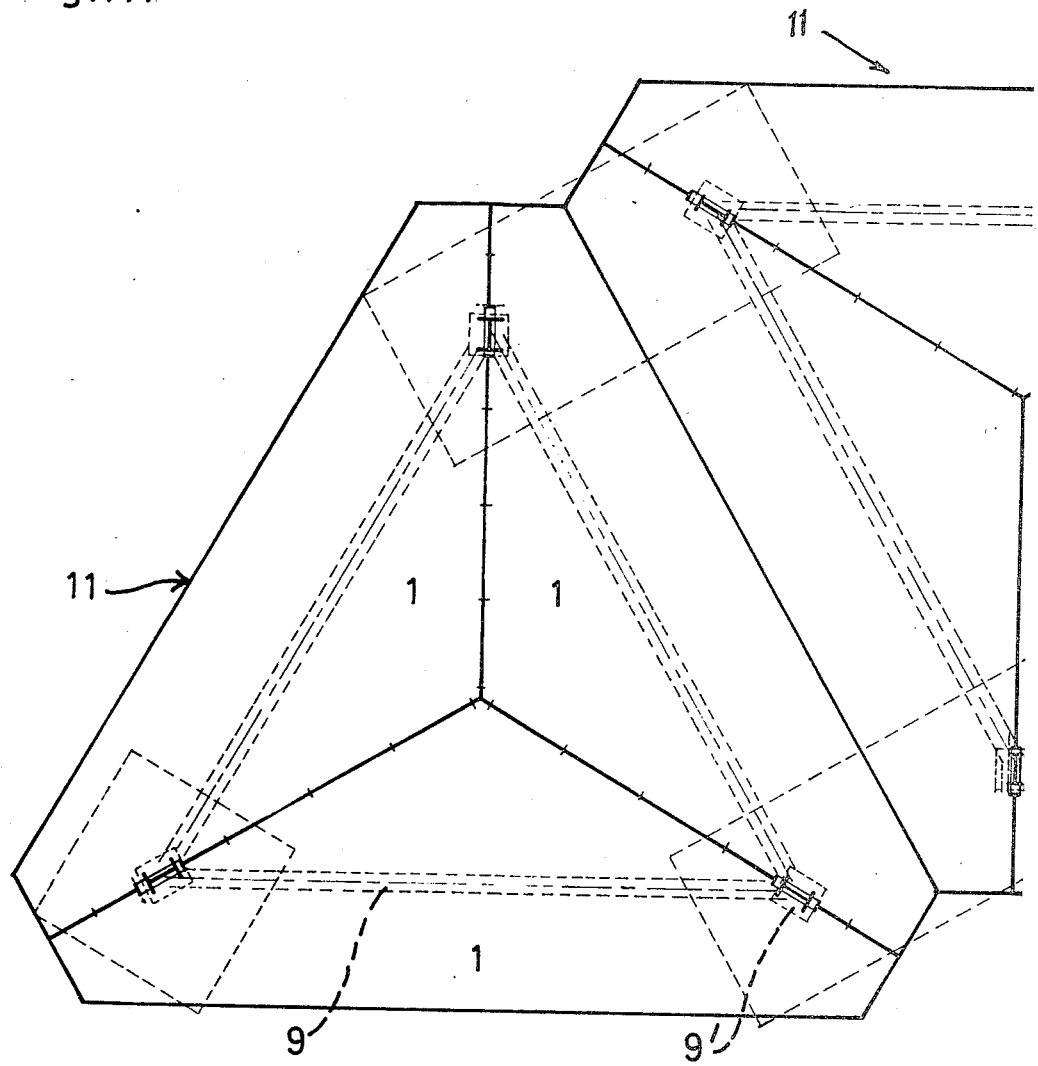

In order that the invention may be more readily understood, reference is made to the accompanying drawings which illustrate diagrammatically and by way of example, several embodiments thereof, and in which:

FIGS. 1 to 6 show in plan view different constructions of the building element in accordance with the invention, FIG. 7a is a perspective view of a building unit comprising three said building elements and adapted to form the floor of a building structure, FIG. 7b is a perspective view of a building unit adapted to form the ceiling (or roof) of a building structure, FIG. 8 is a section on the line VIII—VIII of FIG. 7b, FIG. 9a is an enlarged plan view of a detail "A" of FIG. 11, FIG. 9b is an axometric view of detail "A" of FIG. 11, FIG. 10a is an exploded perspective view of a building structure comprising two building units and the appertaining steel supporting columns, FIG. 10b is an exploded perspective view of a building structure similar to that of FIG. 10a but with appertaining concrete supporting columns, and FIG. 11 is a floor plan of a building structure in which three building units are joined together.

Figure 1:
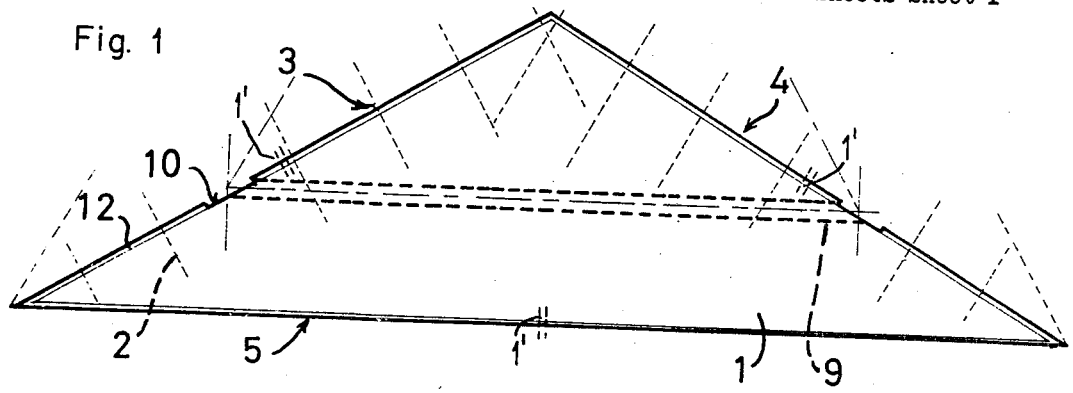
Figure 2:
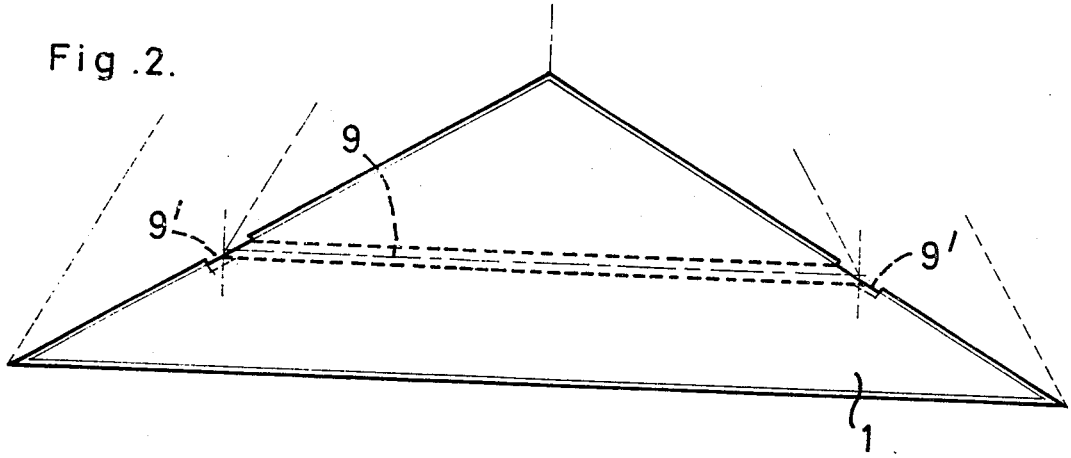
Figure 3:
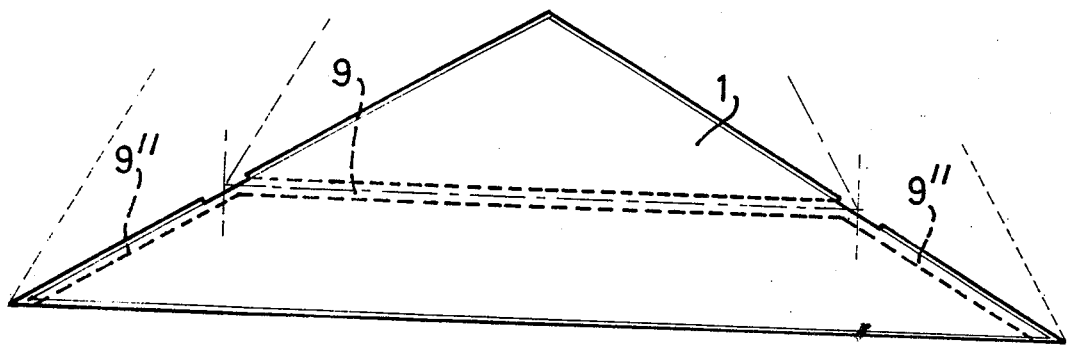

Referring now to the drawings, the building element 1 illustrated in FIGS. 1 to 3 is a flat concrete casting or pressure moulding reinforced with steel wire or rods 2 and having the shape of an isosceles triangle of which the two equal sides 3 and 4 are shorter than the third side or base 5. In these embodiments all three vertices of the triangular moulding are pointed. In the embodiments shown in FIGS. 4 to 6 the two vertices lying opposite one another are truncated as at 6 and 7, the third vertex 8 being substantially pointed. An integrally moulded beam 9 is provided on one of the two largest surfaces of the moulding 1, the beam 9 extending parallel and in spaced relationship to the third side or base 5 of the triangle. The beam 9 may be rectangular or trapezoidal in cross-section.

Figure 4:
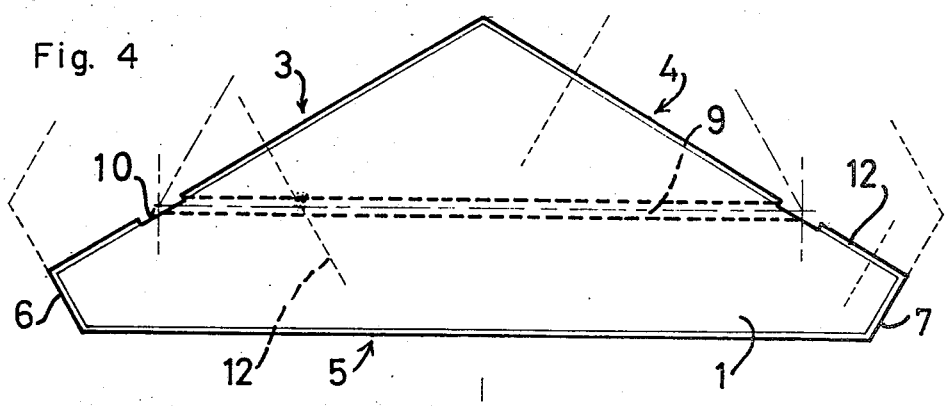

In the embodiments of FIGS. 1 and 4, the beam 9 is straight throughout its length and terminates substantially flush with the edge of the respective equal sides 3 and 4 of the isosceles triangle. In FIGS. 2 and 5 the beam 9 is straight between the two equal sides 3 and 4 of the triangle, and its ends 9' taper and are bent or cranked at an obtuse angle to the beam axis so as to lie parallel along a portion of the edges of the two equal sides 3 and 4 and extend in a direction towards the base 5 of the triangle. The construction of the beam 9 in FIGS. 3 and 6 is similar to that of FIGS. 2 and 5 except that the ends 9" of the of the beam 9 extend to the end of the equal sides of the triangle.

The triangular moulding 1 has an oblong recess 10, more particularly referred to hereinbelow, formed in the edge of each of the two equal sides 3 and 4 of the triangle, the recess 10 being disposed on the centre line of the beam 9.

When the building element 1 is made of concrete, pressure-vacuum extraction method of casting may be employed as an alternative to the conventional type of metal formwork usually associated with this type of casting operation. Instead of being reinforced with steel rods or wire, the concrete slab constituting the building element may be reinforced with steel mesh, glass fibre or matting, or synthetic fibres or matting. The building element may be cast or pressure moulded in appropriately constructed moulds. The method of manufacture may be either standard reinforced concrete, prestressed concrete or post-tensioned concrete. Other materials, for example laminated wood, may be used for producing the building element.

By virtue of the shape of the building element of the invention, easy handling of the element with the minimum of site labour is facilitated. Grooves 1' for lifting cables are provided at predetermined points on the periphery of the triangular slabs 1 when slabs are lifted by crane and cable. Alternatively, the elements 1 may be lifted by vacuum pods. It is also possible to use the oblong recesses 10 for anchoring the lifting cables on the slabs and thus dispensing with any additional grooves. As a result simple handling on the site with minimum labour (two workmen and crane driver) and crane is facilitated, even in cases of elements of considerable surface area.

At selected points along the edges of the equal sides 3 and 4 of the triangular slab 1, the structural steel reinforcement 2 (in the case of concrete slabs) is exposed to facilitate the connecting of the slabs by welding to form a larger building unit 11 as shown in FIGS. 7a and 7b. Each building unit 11 comprises three building elements 1 which are joined together in one plane along their equal sides 3 and 4 to form a larger equilateral triangle. When the building elements 1 are joined together to form the unit 11, the oblong recesses 10 in the edges of adjacent equal sides 3 or 4 of the triangle coincide and form an oblong aperture 15 for receiving support columns 16 (FIG. 10a) of steel or concrete columns 17 (FIG. 10b) of standard construction. Any space left in the aperture 15 is utilized as service duct, for example to locate a water pipe 18 (FIG. 9a).

As mentioned above, the connection of the basic concrete slabs 1 reinforced with steel rods or wire 2 is effected by means of welding together the free, exposed ends of the reinforcement in the equal sides of two adjacent concrete slabs 1. For this purpose a substantially continuous recess 12 is formed in the peripheral edge of the triangular body 1 and a portion of one or the other largest surface thereof, and the reinforcement is so arranged that it projects outwardly through the wall of the recess 12. In order to facilitate the joining of the adjacent exposed ends of the reinforcement 2, a continuity bar 13 is employed as a link for the reinforcements 2 which are welded (as at 13′) to the bar 13. The trough-shaped cavity formed by the adjacent recesses 12 is subsequently filled in situ with concrete. This arrangement additionally serves to compensate for the inaccuracies or differences in the thickness of the casting or moulding of the adjacent concrete slabs. As FIG. 8 shows at 14 the opposite surface edges of the adjacent triangular slabs are relieved or chamfered for the purpose of providing compensation for differences in the thickness of the concrete slabs in this region.

In erecting a simple building structure (FIGS. 10a and b), such as a dwelling, at least two of the building units 11 are used, the units respectively constituting the floor and ceiling (or roof) of the structure and being arranged vertically aligned and spaced apart by means of supporting columns 16 or 17 of steel and concrete respectively, said columns engaging in the oblong apertures 15 provided in the units 11. The steel and concrete columns are of various heights and of various plan grids.

Steel columns are in the form of Rolled Steel Joists of Universal Section (R.S.J. U.S.), weight varying according to load supported. There are variants to the types of steel columns, dependent upon position and function:

(1) Truncated foundation starter columns 21 welded to base plate 22 to be bolted to concrete foundation at one end. The free end has its two flanges 23 cut back to provide a 4″ wide H-section which will pass through the aperture 15 to the edges of the basic floor/ceiling slab shapes. At the base 24 of these cut back flanges 23 L-shaped steel bearer brackets 25 are fixed either side of the web 26 with one face dressed to bear on the cut back flanges 23 of the steel column 21. These brackets 25 so formed are designed to support the integral beam 9 of the floor slab units. The space between ground level and under the floor slab is used for services and maintenance purposes.

(2) Typical floor columns 16 are of universal section as above described, the base of which has two T-shaped bearer brackets 27 fixed to the web of the R.S.J. between the flanges, one arm of each T projecting to form a channel 28 which slips over the web 26 of the truncated foundation starter column 21 or column below. Each of these columns are then welded where the flanges meet to provide vertical continuity of structure. The top part of the column is as described for the truncated foundation column 21 but of larger length to accommodate both ceiling and a further floor slab over.

(3) Typical roof columns are as for typical floor columns but with shorter cut-back flanges at the head to facilitate roof slab housing only.

(4) Typical future extension columns are as above described under 2 or 3 above (dependent upon type of extension required) but with cut-back flanges at the base to pass through the housing aperture in the floor and roof slabs.

Concrete columns of various heights and various plan grids.

(1) Truncated "stub" starter columns 29 are cast in situ with foundations. The section is such as to accommodate rain-water pipes 30 where required and building services where required.

The height of the column 29 is such as to provide a crawl-space under the ground floor slab where building services can be accommodated, and serviced. The stub column 29 has built in housing seats 31 for the ground floor slab beams (beams to all floor slabs being inverted).

(2) Typical ground and standard concrete columns 32 which are pre-cast are of circular section with circular cavity down the centre for rain-water pipes 33 or services. Grooves may be provided on opposite external faces to the columns 32 dependent upon the desirability of services in these positions. Where grooves for services are provided these are then grouted over or covered when the services have been placed in position.

The base of the column 32 has an elongated concrete shoe 34 of rectangular section to pass through the aperture 15 in the edge of the floor slabs. The end of the concrete shoe is splayed to be accommodated (in opposite profiled housing) to either concrete stub base or the head stub of the reinforced concrete column 29 below. The head shoe 35 is of similar rectangular section but of varying length dependent upon whether roof slab only is to be accommodated, or ceiling slab and roof slab. The top side of the rectangular shoe 35 has a V-shaped depression to take the splayed end of the upper column shoe.

(3) Typical "One Floor" extension columns which are pre-cast are as described under item 2 above but the rectangular base shoe 34 is of longer section to facilitate passing through floor and part of ceiling slab-sections and head shoe of short section to accommodate roof slab and facilitate future extension as and when required.

(4) Typical extension column for "Multiple extension" which is pre-cast is as above described under item 3, above but with head shoe of larger length as under item 2 above.

In erecting a building structure, for example of several storeys, a plurality of said larger units 11 are joined together side by side (FIG. 11) on column seatings provided on the stub piers 29 or steel columns 21 disposed in the ground and a single temporary support to each unit 11 where the three basic isosceles triangular elements 1 of each unit 11 meet. These form the ground floor of the lowermost part of the building. The three basic triangular elements 1 of each unit 11 when correctly seated and aligned are welded at the points provided to form a completed building unit deck. Weld points are then grouted over. The floor deck is now ready for columns to be slotted in the apertures 15 provided. It will be noted that three stub piers 29 are used for supporting each unit 11, the piers 29 being respectively located on the centre lines of the integral beams 9 or adjacent to the truncated portions of the unit (where truncated). The unit forming the floor rests flat on the two top faces of the stub piers 29 provided in such manner that the beams 9 face the ground, the two adjacent free ends of two respective integral beams 9 each engaging a recess and a shoulder formed in the stub pier 29. The stub piers 29 project above the ground level so that a space is formed between the ground surface and the facing surface of the unit 11 for accommodating services of the building structure and providing insulation and making the structure free from problems of dampness. A similar process is used where steel columns are provided. At least one of the stub piers 29 per completed unit 11 is preferably further provided with a bore or recess for receiving a pipe connection 33 for rain-water drainage. Vertical extension is effected by the columns 19 or 20.

Where concrete columns 17 are used the rectangular shoe is slotted in the apertures provided in the ground floor slab. Steel pins may be slotted through the two adjacent integral beams 9 and the column shoe for added stability. The temporary support is removed from under the centre of each unit 11 when spot welding has been completed. This temporary support is then placed in position on the ground floor unit 11 to receive the ceiling slabs at the higher level.

The ceiling of the lowermost part of the building structure is again formed by three isosceles triangular units 11 to form one larger equilateral triangle. The isosceles units are jointed together side by side and in horizontal and vertical alignment with the units forming the ground floor. The integral beams 9 in all ceiling units being placed in an upstand position to provide a flat ceiling surface throughout.

The subsequent "first floor" is provided in like manner through all floor units have their integral beams 9 in an inverted position to provide a flat floor surface uppermost. The first floor integral inverted beam 9 rests upon the ceiling upstand beam below.

Between each two units forming the floor and ceiling, three precast concrete columns or steel columns per unit are inserted in the slab apertures 15, each being located in vertical alignment with the respective stub pier in the ground. The units forming the ceiling rest flat on the faces of the R.C. columns or on the steel brackets and flanges of the steel columns with the beams facing away from the floor and ceiling below. At least one of the supporting columns per unit 11 is preferably provided with a base for receiving a downpipe insert and/or services, for example, of polythene rainwater pipe, which runs from the roof of the structure through all the units and issues into the said stormwater pipe connection at ground level. The posts or columns also serve as spacing members between floor and ceiling and determine the height of the ceiling.

For constructing the floor of the next higher part of the building the process is repeated after all welding and grouting operations are completed on the floor below. The temporary support in the centre of each unit 11 is moved to the next floor location.

Three basic isosceles elements 1 per unit 11 are again arranged in alignment wih the ones lying therebelow and in relation to the column seating provided but with the ceiling beams in the upstand position and the next floor beams in the inverted position resting on the ceiling beams so that a space is formed which again may be utilized for accommodating services of the building structure. An acoustic strip may be placed between integral beams 9 for sound-proofing purposes. The ceiling of the said higher part of the building structure is constructed in the manner described heretofore and the process is continued up to the highest part of the building structure where the last ceiling simultaneously forms the roof part of the structure, with simple extension facilities at a later date—should this ever be required.

The construction of the walls and facing of the building structure may be effected in any conventional manner, and the invention is not concerned with this aspect of the building structure.

As a supplement building element a concrete slab may be used which is rectangular in plan with integral T beam and cast-in apertures for vertical structure services. The T section shaped slabs provide for added flexibility of plan shape layout in the overall building system.

I claim:

1. A building unit comprising three flat building elements each having the shape of an isosceles triangle of which the two equal sides are shorter than the base side and having upon one of its two largest surfaces an integral beam extending parallel to said base side and in spaced relationship thereto, said three building elements being joined together in one plane along said equal sides to form a larger equilateral triangle, each said equal side of each said element being recessed adjacent the center line of said beam, the recesses in adjoining sides of said elements coinciding to form an aperture adapted to receive a vertical support member.

2. A building structure comprising a plurality of building units as claimed in claim 1 vertically aligned and spaced apart by means of vertical supporting members engaging said apertures.

3. The building unit of claim 1 wherein a substantially continuous recess is formed in the peripheral edge of each said building element and in an adjacent portion of one of the two largest surfaces of each said element.

4. The building unit of claim 1 wherein the base vertices of each of said building elements are truncated, the vertex opposite the base edge of each said element being substantially pointed.

5. The building unit of claim 1 wherein said beams are straight throughout and terminate substantially flush with the periphery of said apertures.

6. The building unit of claim 1 wherein said beams have a straight central portion and outer portions oriented at obtuse angles to said central portion and parallel to the equal sides of said building elements.

7. The building units of claim 6 wherein said outer portions extend to the base vertices of said building elements.

8. The building unit of claim 1 wherein said building elements are of concrete reinforced with steel reinforcing elements, and said reinforcing elements are exposed for joining at said equal sides of said building elements.

9. The building unit of claim 8 wherein said reinforcing elements are joined within a trough-shaped cavity defined by substantially continuous recesses formed in the peripheral edge of each said building element and in an adjacent portion of one of the two largest surfaces of each said building element.

10. The building unit of claim 9 wherein said reinforcing elements are welded to a continuity bar disposed longitudinally within said cavity and said cavity is subsequently filled with concrete.

References Cited

UNITED STATES PATENTS

| 865,145 | 9/1907 | Zimmer | 52—587 |
| 2,025,815 | 12/1935 | Horridge | 94—13 |
| 3,096,695 | 7/1963 | Reinhardt | 94—11 |
| 3,152,366 | 10/1964 | McCrory et al. | 52—237 |
| 3,372,518 | 3/1968 | Rensch | 52—263 |

FOREIGN PATENTS

| 12,034 | 6/1894 | Great Britain. |
| 852,851 | 11/1934 | Great Britain. |
| 6,950 | 5/1922 | Netherlands. |
| 29,255 | 1/1922 | Denmark. |
| 335,887 | 2/1904 | France. |
| 1,134,770 | 12/1956 | France. |

HENRY C. SUTHERLAND, Primary Examiner

JAMES L. RIDGILLA, Jr., Assistant Examiner

U.S. Cl. X.R.

52—220, 263, 602, 608; 94—11